US006224081B1

(12) United States Patent
Wayman et al.

(10) Patent No.: US 6,224,081 B1
(45) Date of Patent: May 1, 2001

(54) ADJUSTABLE BACKREST FOR A MOTORCYCLE

(75) Inventors: Stephanie J. Wayman, Hartland; Richard A. Peller, Waterford, both of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/365,309

(22) Filed: Jul. 30, 1999

(51) Int. Cl.[7] ......................................................... B62J 1/00
(52) U.S. Cl. ..................................... 280/288.4; 280/304.4; 297/215.12; 297/383
(58) Field of Search ............................. 280/288.4, 304.3, 280/304.4; 297/215.11, 215.12, 383; 348/118, 286, 291.1, 298.1

(56) References Cited

U.S. PATENT DOCUMENTS

| | | | | |
|---|---|---|---|---|
| 3,822,917 | * | 7/1974 | George ................................... | 297/195 |
| 4,113,308 | * | 9/1978 | Werner et al. ......................... | 297/362 |
| 4,294,488 | * | 10/1981 | Pickles .................................. | 297/367 |
| 4,384,744 | * | 5/1983 | Barley .................................... | 297/367 |
| 4,657,425 | * | 4/1987 | Takahashi ............................. | 403/104 |
| 4,913,494 | * | 4/1990 | Ikegaya ................................. | 297/367 |
| 5,150,632 | * | 9/1992 | Hein ....................................... | 74/530 |
| 5,282,670 | * | 2/1994 | Karsten et al. ........................ | 297/370 |
| 5,997,088 | * | 12/1999 | Stark et al. ........................... | 297/354.13 |
| 6,007,150 | * | 12/1999 | Clerkin et al. ........................ | 297/215.12 |

FOREIGN PATENT DOCUMENTS

2245158 * 5/1975 (FR) .

OTHER PUBLICATIONS

Custom Chrome Catalog 1999—pp. 3.12, 3.17 and 3.28.
Uniquely V–Twin Manufacturing Catalog 1994—pp. 510 and 511.
Harley–Davidson Motor Company Service Parts—1997 Model Rider Backrest—dated Nov. 1997.
Harley–Davidson Motor Company Product Features—Seat with Adjustable Rider Backrest—dated Feb. 26, 1998—(2 pages).

* cited by examiner

Primary Examiner—Brian L. Johnson
Assistant Examiner—Daniel Yeagley
(74) Attorney, Agent, or Firm—Michael Best & Friedrich LLP

(57) ABSTRACT

The present invention is directed to a motorcycle. The motorcycle includes a backrest that is coupled to a shaft. The shaft is positioned inside a torsion spring that inhibits rotation of the shaft in order to prevent movement of the backrest in a rearward direction. The backrest is adjusted rearwardly by disengaging the torsion spring from the shaft in order to permit the shaft and backrest to rotate.

22 Claims, 4 Drawing Sheets

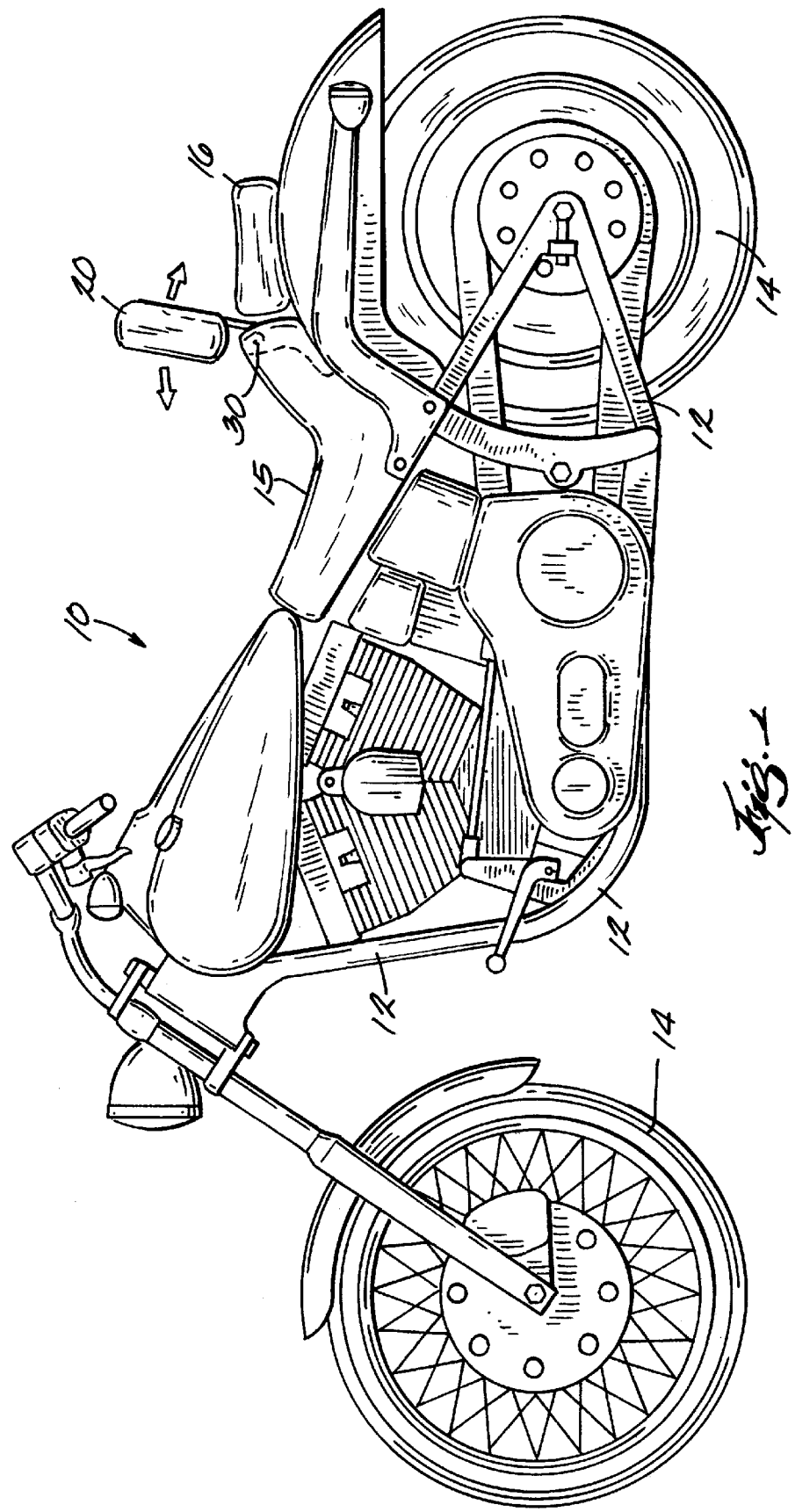

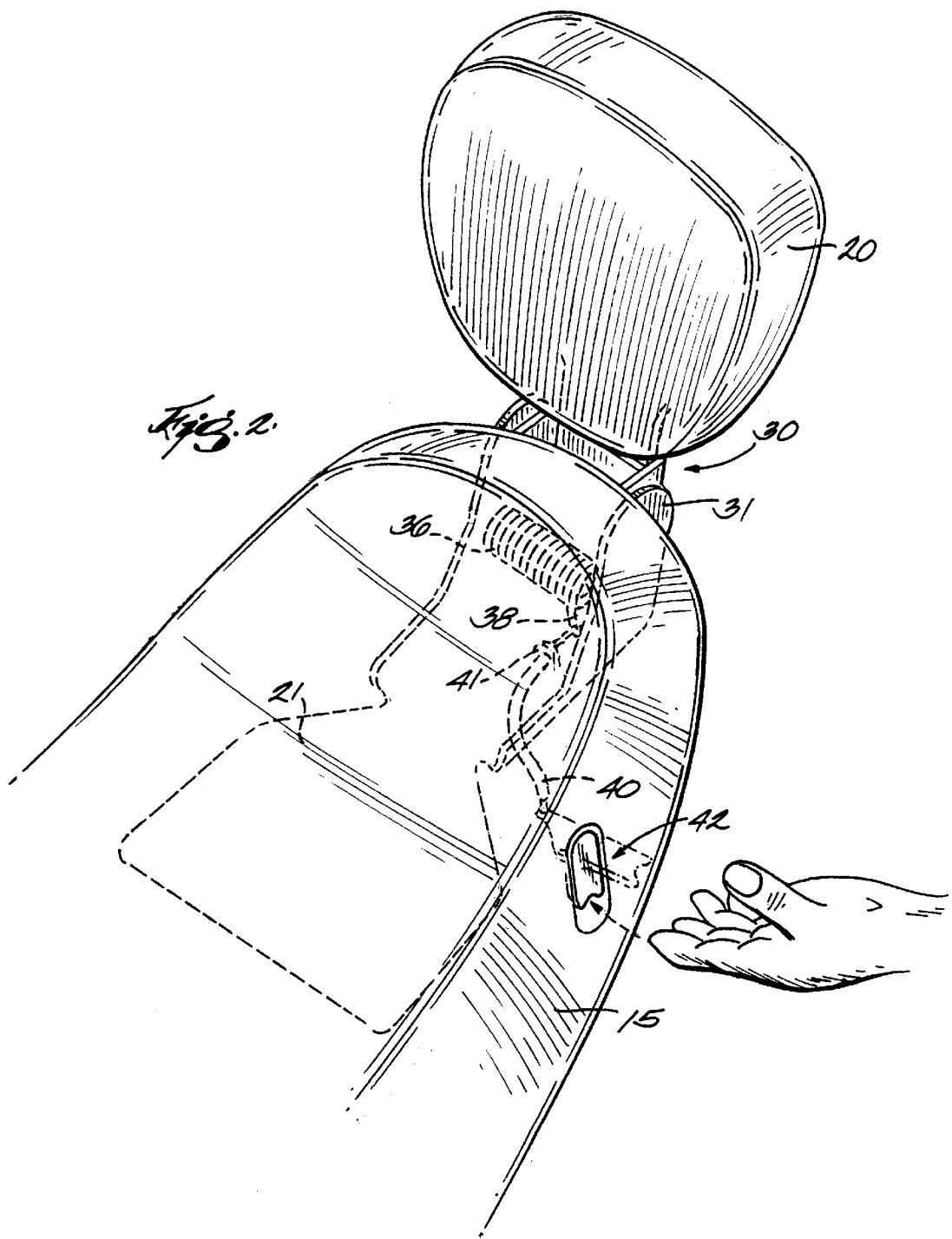

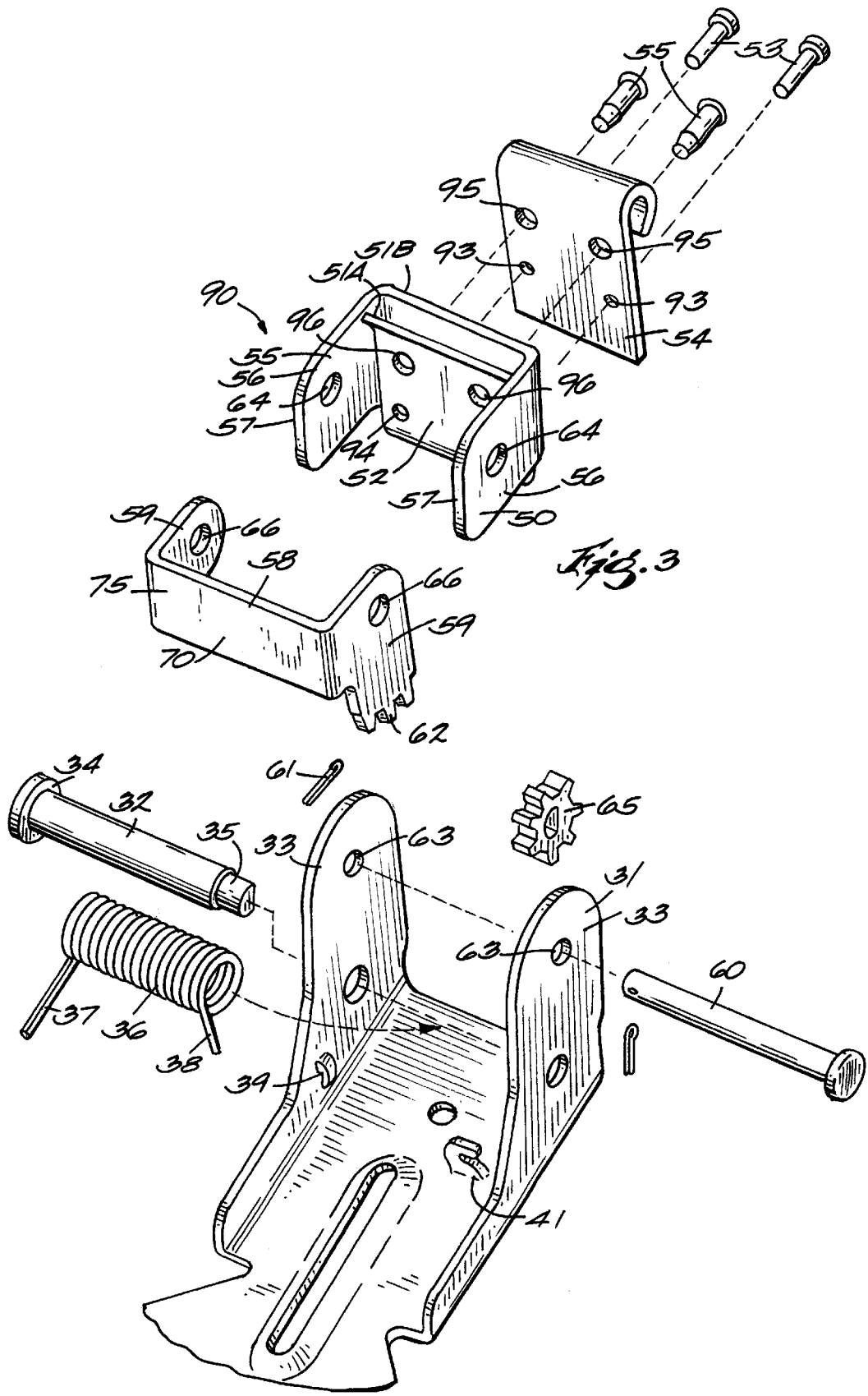

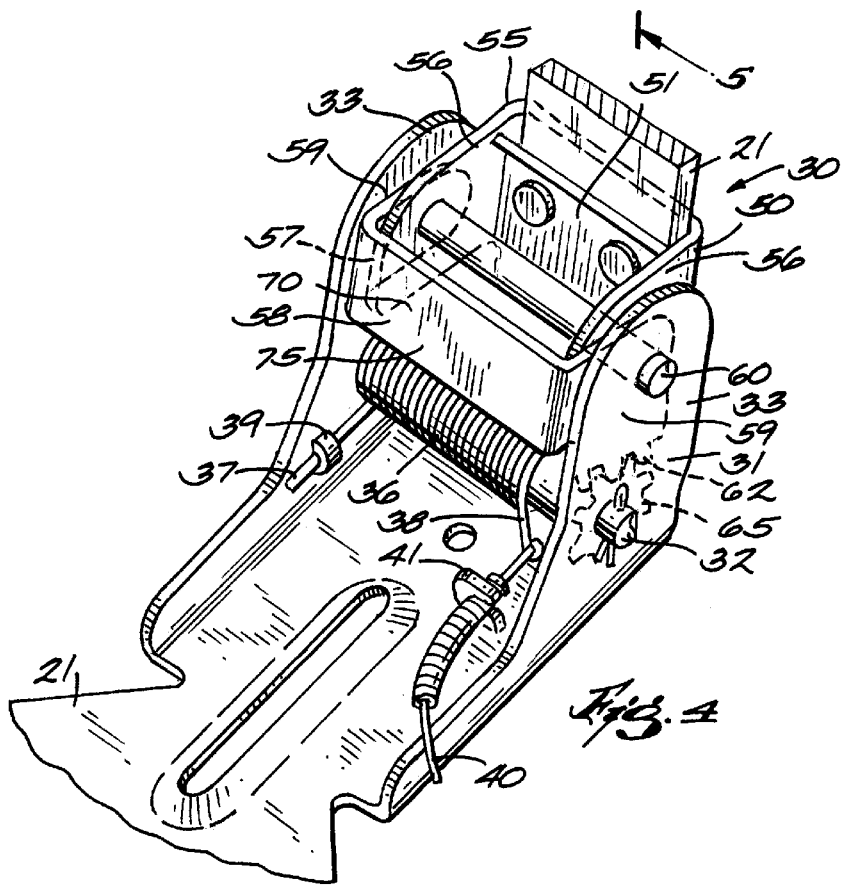
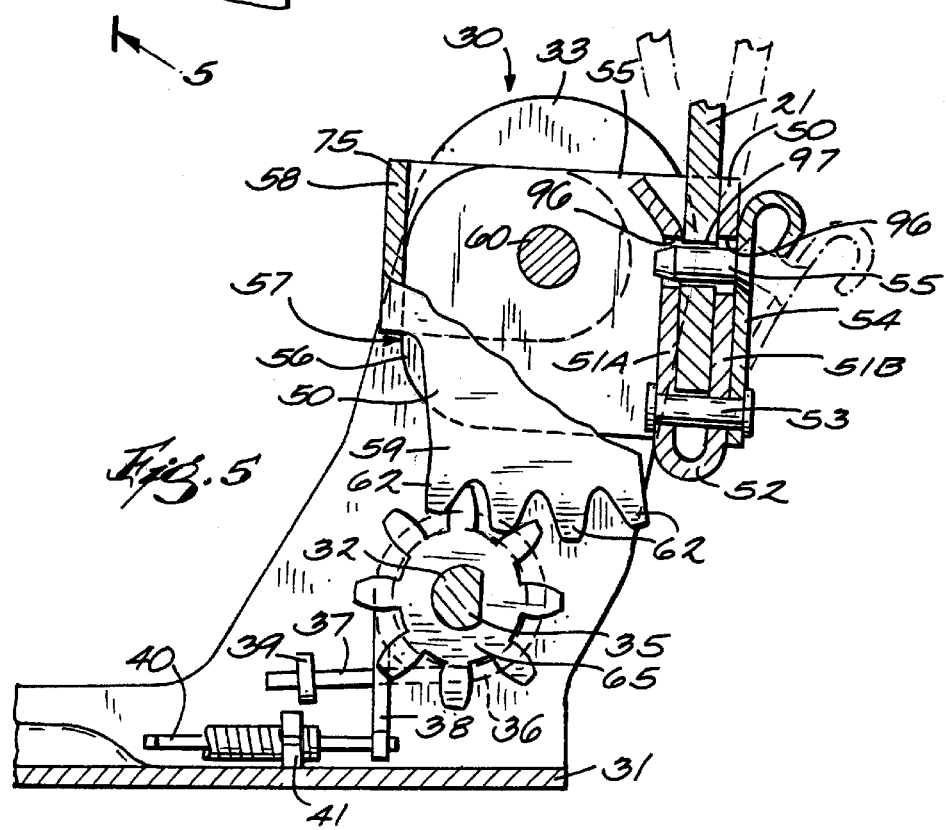

ADJUSTABLE BACKREST FOR A MOTORCYCLE

FIELD OF THE INVENTION

This invention relates generally to motorcycles, and more particularly to adjustable backrest assemblies for motorcycles.

BACKGROUND OF THE INVENTION

Some motorcycles typically include a backrest that provides support to a passenger and/or a driver seated on a motorcycle. The backrests are commonly adjustable and/or removable.

One adjustable backrest uses a gas air spring positioned under the motorcycle seat to maneuver the backrest. A piston in the gas spring is connected to a bracket that extends down from the backrest. In this manner, the gas spring biases the backrest toward a forward position. The gas spring includes a locking mechanism that can lock the piston in a desired position. The backrest is adjusted by disengaging the lock, changing the position of the backrest, and re-engaging the lock. The lock is biased toward an engaged position, and can be deactivated by a control located on the exterior of the motorcycle.

One of the drawbacks associated with using a gas spring to adjust a backrest is the difficulty associated with assembling the gas spring to the motorcycle. Another drawback is the amount of space that is required to position the gas spring under the seat. Gas springs are also typically expensive, adding significantly to the overall cost of producing the motorcycle.

SUMMARY OF THE INVENTION

An adjustable motorcycle backrest should include several features. First, an adjustable backrest should remain stable against a rider during operation of the motorcycle. Second, a backrest should have enough of a range of adjustment to allow riders of all size to comfortably use the motorcycle. Third, an adjustable backrest should be inexpensive to manufacture and easily assembled to other parts of the motorcycle. Fourth, an adjustable backrest should have an aesthetically pleasing appearance when it is mounted on the motorcycle. Finally, an adjustable backrest should be easy to manipulate so that there is a minimal amount of effort required to maneuver the backrest into a desired position.

The present invention is embodied in a motorcycle that includes a backrest coupled to a shaft that is positioned inside a torsion spring. The torsion spring inhibits rotation of the shaft in order to prevent movement of the backrest in a rearward direction. The backrest is adjusted rearwardly by disengaging the torsion spring from the shaft in order to permit the shaft (and backrest) to rotate.

In another aspect, the invention relates to a method of adjusting a motorcycle backrest assembly. The method comprises the steps of disengaging a torsion spring from a shaft; moving a backrest that is coupled to the shaft; and engaging the torsion spring in order to secure the shaft.

Other principle advantages of the invention would become apparent to those skilled in the art upon review of the following drawings, the detailed description and the attached claims.

BRIEF DESCRIPTION OF THE DRAWINGS

FIG. 1 is a side view of a motorcycle embodying the present invention.

FIG. 2 is an enlarged perspective view of the backrest assembly on the motorcycle of FIG. 1.

FIG. 3 is an exploded perspective view of the backrest assembly of FIG. 2.

FIG. 4 is an assembled perspective view of the backrest assembly of FIG. 2 with a portion of the pad removed.

FIG. 5 is a section view of the backrest assembly taken along line 5—5 in FIG. 4.

DETAILED DESCRIPTION

The illustrated motorcycle 10 includes a frame 12, wheels 14, a driver seat 15, a passenger seat 16 and a backrest 20 positioned above and between the driver seat 15 and the passenger seat 16. The backrest 20 is pivotally adjustable toward the front and back of the motorcycle, as illustrated by the arrows in FIG. 1.

As shown most clearly in FIG. 2, the backrest 20 is part of an assembly 30 that includes a mounting bracket 31. The mounting bracket 31 may be integral with the frame or a separate piece as shown in FIG. 2. The mounting bracket 31 illustrated in FIG. 2 includes a plate 21 (shown in dashed lines in FIG. 2) that facilitates coupling the mounting bracket 31 to the motorcycle frame. The backrest 20 could also be placed behind the passenger seat 16, or any other suitable location without departing from the scope of the present invention.

FIGS. 3–5 show the assembly 30 in detail. In the illustrated embodiment, the mounting bracket 31 is generally U-shaped and a shaft 32 extends between opposing sides 33 of the bracket 31. One end of the shaft 32 includes an enlarged head 34 that butts up against one of the opposing sides 33. A D-shaped projection 35 is on the other end of the shaft 32. The D-shaped projection 35 extends through the other opposing side 33 of the bracket 31 such that the shaft 32 rotates with respect to the bracket 31.

A torsion spring 36, having a first end 37 and a second end 38, is positioned around the shaft 32. The inside diameter of the torsion spring 36 is slightly smaller than the outside diameter of the shaft 32 such that the torsion spring 36 inhibits rotation of the shaft 32 in the counter-clockwise direction (as viewed from the perspective shown in FIG. 5) until the torsion spring 36 is disengaged from the shaft 32. The torsion spring 36 is disengaged from the shaft by applying an opposing force to the first end 37 and the second end 38 of the torsion spring 36. The opposing force uncoils the torsion spring 36 and enlarges the diameter of the torsion spring 36 enough to permit rotation of the shaft 32.

A clamp 39 secures the first end 37 of the torsion spring 36 to the mounting bracket 31. The second end 38 of the torsion spring 36 is connected to an actuating member. In the embodiment of the invention illustrated in FIGS. 4 and 5, the actuating member includes a cable 40 and a lever 42 (FIG. 2). The cable 40 extends through a guide 41 until the cable 40 reaches the lever 42 positioned on the outer surface of the seat 15. The lever 42 is flush with the outer surface of the seat 15 until the lever 42 is pulled outward. Pulling the lever 42 outward exerts a force on the cable 40, which, in turn, exerts a force on the second end 38 of the torsion spring 36. Since the first end 37 of the cable 40 is secured to the clamp 39 on the mounting bracket 31, an opposing force is generated on the torsion spring 36. The opposing force disengages the torsion spring 36 from the shaft 32 thereby permitting the shaft 32 to rotate in either direction with respect to torsion spring 36 and the mounting bracket 31.

A first gear 65 that includes a D-shaped opening is mounted on to the D-shaped projection 35. Although the projection 35 is D-shaped, it should be understood the projection 35 and the corresponding opening in the first gear 65 can take any form that transfers torque from the first gear 65 to the shaft 32.

A second gear 62 couples the first gear 65 to the backrest 20. In one form of the invention, the second gear 62 is coupled to a pivot bracket 90 that is coupled to the backrest 20. The pivot bracket 90 is rotatably coupled to a rod 60 that extends through aligned openings 63 in the opposing sides 33 of the mounting bracket 31. A cotter pin 61 secures the rod 60 in place. In the illustrated embodiment, the pivot bracket 90 includes a stop bracket 70, a pivot receptacle 50 and a leaf spring 54.

The stop bracket 70 includes a U-shaped section 75 that is rotatably coupled to the rod 60. The U-shaped section 75 includes a base section 58 and opposing sides 59 that are positioned inside, and adjacent to, the opposing sides 33 of the mounting bracket 31. The rod 60 extends through axially aligned openings 66 in the opposing sides 59 of the U-shaped section 75. One of the opposing sides 59 on the stop bracket is integral with the second gear 62.

The pivot receptacle 50 is also rotatably coupled to the rod 60. The pivot receptacle 50 includes a U-shaped section 51 having opposing sides 56 that are positioned inside, and adjacent to, opposing sides 59 on the stop bracket 70. The pivot receptacle 50 includes axially aligned openings 64 that are aligned with the openings 66 in the stop bracket 70 and the openings 63 in the mounting bracket 31 such that the rod 60 extends through all of the openings 63, 64, 66. The opposing sides 56 have end portions 57 that engage the base section 58 of the stop bracket 70. The pivot receptacle 50 further includes another U-shaped section 52 having opposing sides 51A, 51B. A leaf spring 54 is connected to the outermost side 51B of the U-shaped section 52 by rivets 53 positioned through lower openings 93 in the leaf spring and lower openings 94 in the U-shaped section 52. Retention pins 55 are press-fit into upper openings 95 in the leaf spring 54 such that the retention pins 55 extend through upper opening 96 in the U-shaped section 52.

The backrest 20 can be inserted and removed from the assembly 30. The backrest is inserted by applying a rearward force to the leaf spring 54. The rearward force needs to be of sufficient magnitude to move the retention pin 55 back into the opposing sides 51B on the U-shaped section 52. Moving the retention pin 55 rearward into the opposing side 51B allows a downwardly extending portion 21 on the backrest 20 to be inserted between the opposing sides 51A, 51B (see FIG. 5). The backrest 20 is secured in between the opposing sides 51A, 51B by releasing the leaf spring 54 such that pins 55 move forward through the upper openings 96 in both opposing sides 51A, 51B and an opening 97 in the downwardly extending portion 21. Alignment between the opening 97 in the downwardly extending portion 21 and the upper openings 96 in the opposing sides 51A, 51B is ensured because the downwardly extending portion 21 is inserted between the opposing sides 51A, 51B until a bottom edge 98 on the downwardly extending portion 21 comes into contact with the rivets 53.

The backrest 20 is removed from the assembly 30 by exerting enough of a force on the leaf spring 54 to move the leaf spring 54 backward (see FIG. 5) until the pins 55 are removed from the downwardly extending portion 21. Once the pins 55 have been removed, the downwardly extending portion 21 is extracted from between the opposing sides 51A, 51B.

The procedure for adjusting the backrest in either the forward or rearward direction begins with an operator pulling the lever 42. As stated previously, when the lever 42 is pulled, the cable 40 pulls on the second end 38 of the torsion spring 36 and generates an opposing force within the torsion spring 36. The opposing force disengages the torsion spring 36 from the shaft 32 allowing the shaft 32, the first gear 65, the second gear 62 and the pivot bracket 90 to rotate with respect to the mounting bracket 31.

The operator next manipulates the backrest 20 either forward or backward to the desired location. Maneuvering the backrest 20 causes the pivot receptacle 50 to rotate about the rod 60. The end portions 57 of the pivot receptacle engage the base section 58 of the stop bracket 70 such that any rotation of the pivot receptacle 50 causes rotation of the stop bracket 70 about the rod 60. As the stop bracket 70 rotates, the integral second gear 62 causes the first gear 65 to rotate. Since the first gear 65 engages the D-shaped projection 35 on the shaft 32, the shaft 32 rotates when the first gear 65 rotates.

The shaft 32 is allowed to rotate in both directions because the operator has previously disengaged the torsion spring 36 from the shaft 32 by manipulating the lever 42. Once the backrest 20 is adjusted to the proper location, the operator releases the lever 42 such that there is no longer any force applied to the second end 38 of the torsion spring 36. The torsion spring 36 returns to its original position, which inhibits rotation of the shaft 32 in the counter-clockwise direction, and consequently, inhibits the backrest 20 from moving any further rearward.

The backrest 20 can be adjusted in the forward direction without disengaging the torsion spring 36 from the shaft 32 (i.e., by pulling on the lever 42) because the torsion spring 36 does not significantly inhibit clockwise rotation of the shaft 32. The backrest is forwardly adjusted by applying a forward force to the backrest 20 that is sufficient to overcome the friction between the torsion spring 36 and the shaft 32. The forward force on the backrest 20 urges the shaft 32 to rotate clockwise, and clockwise rotation of the shaft 32 partially disengages the shaft 32 from the torsion spring 36 thereby reducing the friction between the torsion spring 36 and the shaft 32. The reduced friction between the torsion spring 36 and shaft 32 lowers the amount of force that is required to continue forwardly adjusting the backrest 20. When no forward force is applied to the backrest 20, the friction between the torsion spring 36 and the shaft 32 is enough to preclude the shaft 32 from rotating clockwise. Therefore, the friction between the torsion spring 36 and the shaft 32 precludes the backrest 20 from moving forward unless a forward force is applied to the backrest 20.

The foregoing description in the present invention has been presented for purposes of illustration and description. Furthermore, the description is not intended to limit the invention to the form disclosed herein. Consequently, variations and modifications commensurate with the above teachings, in the skill or knowledge of the relevant art are within the scope of the present invention. The embodiments described herein are further intended to explain the best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle backrest assembly comprising:
   a mounting bracket adapted to be connected to a frame on a motorcycle;

a shaft rotatably coupled to said mounting bracket;

a torsion spring engages around said shaft, said torsion spring being movable between an engaged position, where said torsion spring prevents rotation of said shaft, and a disengaged position; and a backrest coupled to said shaft, said backrest being adjusted by disengaging said torsion spring in order to permit rotation of said shaft.

2. The motorcycle backrest assembly of claim 1, wherein said torsion spring includes a first end secured to said mounting bracket and a second end extending away from said shaft.

3. The motorcycle backrest assembly of claim 2, further comprising an actuating member coupled to said second end of said torsion spring, said torsion spring being disengaged by applying a force to said actuating member.

4. The motorcycle backrest assembly of claim 3, wherein said actuating member comprises a cable coupled to said second end.

5. The motorcycle backrest assembly of claim 1, further comprising:

a first gear mounted near one end of said shaft;

a second gear coupling said backrest to said first gear; and wherein said first gear and said second gear both rotate as said backrest is adjusted.

6. The motorcycle backrest assembly of claim 5, further comprising a pivot bracket secured between said second gear and said backrest.

7. The motorcycle backrest assembly of claim 6, wherein said second gear is integral with said pivot bracket.

8. The motorcycle backrest assembly of claim 1, wherein said backrest is detachably coupled to said shaft.

9. The motorcycle backrest assembly of claim 5, further comprising a pivot bracket secured between said second gear and said backrest, and a leaf spring coupled to said pivot bracket, said leaf spring being adapted to move said pivot bracket between an open position where the backrest can be inserted and removed from the pivot bracket and a closed position.

10. A motorcycle comprising:

a frame;

a first wheel and a second wheel coupled to said frame;

a seat coupled to said frame;

a shaft rotatably coupled to said frame;

a torsion spring engages around said shaft, said torsion spring being movable between an engaged position, where said torsion spring prevents rotation of said shaft, and a disengaged position; and a backrest coupled to said shaft, said backrest being adjusted by disengaging said torsion spring in order to permit rotation of said shaft.

11. The motorcycle of claim 10, wherein said torsion spring includes a first end secured to said frame and a second end extending away from said shaft.

12. The motorcycle of claim 11 further comprising an actuating member coupled to said second end of said torsion spring, said torsion spring being disengaged by applying a force to said actuating member.

13. The motorcycle of claim 12 wherein said actuating member comprises a cable coupled to said second end.

14. The motorcycle of claim 13 further comprising:

a first gear mounted near one end of said shaft;

a second gear coupling said backrest to said first gear; and wherein said first gear and said second gear both rotate as said backrest is adjusted.

15. The motorcycle of claim 14, further comprising a pivot bracket secured between said second gear and said backrest.

16. The motorcycle of claim 15, wherein said second gear is integral with said pivot bracket.

17. The motorcycle of claim 10, wherein said backrest is detachably coupled to said shaft.

18. The motorcycle of claim 14, further comprising a pivot bracket secured between said second gear and said backrest, and a leaf spring coupled to said pivot bracket, said leaf spring being adapted to move said pivot bracket between an open position where the backrest can be inserted and removed from the pivot bracket and a closed position.

19. A method of adjusting a motorcycle backrest assembly having a shaft, a torsion spring engages around the shaft, and a backrest coupled to the shaft, said method comprising the steps of:

disengaging the torsion spring from an engaged position to a disengaged position by enlarging a diameter of the torsion spring enough to permit rotation of the shaft;

moving the backrest and simultaneously rotating the shaft; and engaging the torsion spring with the shaft to inhibit rotation of the shaft.

20. The method of adjusting a motorcycle backrest assembly as claimed in claim 19 wherein said step of disengaging a torsion spring from the shaft includes the step of applying a force to an end of the torsion spring.

21. The method of adjusting a motorcycle backrest assembly as claimed in claim 20 wherein said step of applying a force to an end of the torsion spring includes the step of pulling a cable attached to the end of the torsion spring.

22. The method of adjusting a motorcycle backrest assembly as claimed in claim 19 wherein said assembly further includes a first gear coupled to the shaft and a second gear coupling the backrest with the first gear, and wherein said step of moving the backrest includes the step of rotating the first gear and the second gear.

* * * * *

UNITED STATES PATENT AND TRADEMARK OFFICE
CERTIFICATE OF CORRECTION

PATENT NO. : 6,224,081 B1
DATED : May 1, 2001
INVENTOR(S) : Stephanie J. Wayman and Richard A. Peller It is certified that error appears in the above-identified patent and that said Letters Patent is hereby corrected as shown below:

Drawings,
Correct Fig. 3 changing reference "55" to -- 51 -- and Fig. 5 adding reference -- 98 -- as follows:

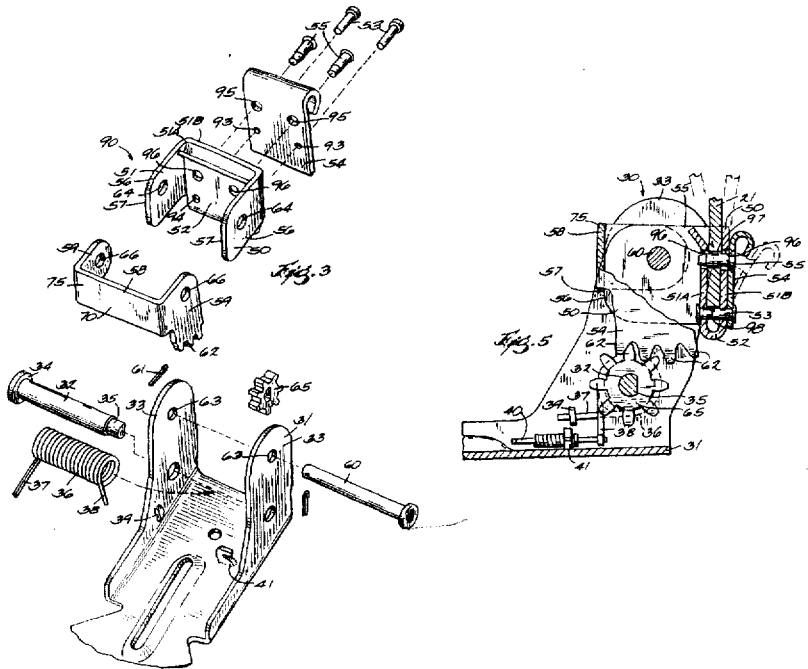

Signed and Sealed this

Ninth Day of April, 2002

Attest:

JAMES E. ROGAN
Director of the United States Patent and Trademark Office

Attesting Officer